United States Patent
Takasaki et al.

(10) Patent No.: US 7,610,978 B2
(45) Date of Patent: Nov. 3, 2009

(54) BATTERY UNIT MOUNTING STRUCTURE FOR ELECTRIC VEHICLE

(75) Inventors: Seiichi Takasaki, Okazaki (JP); Nobuyuki Shimura, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/332,985

(22) Filed: Dec. 11, 2008

(65) Prior Publication Data

US 2009/0152034 A1    Jun. 18, 2009

(30) Foreign Application Priority Data

Dec. 14, 2007    (JP) .............................. 2007-323729

(51) Int. Cl.
*B60R 16/04*    (2006.01)
*H01M 2/10*    (2006.01)

(52) U.S. Cl. ................... 180/68.5; 180/65.1; 180/65.21; 429/96; 429/97; 429/98; 429/99; 429/100

(58) Field of Classification Search ............... 180/65.1, 180/65.21, 65.29, 68.5; 429/96–100
See application file for complete search history.

(56) References Cited

U.S. PATENT DOCUMENTS

| | | | | |
|---|---|---|---|---|
| 4,365,681 A * | 12/1982 | Singh | .................. | 180/68.5 |
| 5,097,789 A * | 3/1992 | Oka | .................. | 114/363 |
| 5,390,754 A * | 2/1995 | Masuyama et al. | .......... | 180/68.5 |
| 5,501,289 A * | 3/1996 | Nishikawa et al. | .......... | 180/68.5 |
| 5,534,364 A * | 7/1996 | Watanabe et al. | .............. | 429/61 |
| 6,188,574 B1 * | 2/2001 | Anazawa | .................... | 361/695 |
| 6,227,322 B1 * | 5/2001 | Nishikawa | ................. | 180/68.5 |
| 6,371,229 B1 * | 4/2002 | Kakiuchi | .................. | 180/65.25 |
| 6,598,691 B2 * | 7/2003 | Mita et al. | .................. | 180/65.1 |
| 6,938,553 B2 * | 9/2005 | Tamaki et al. | .................. | 104/34 |
| 7,051,825 B2 * | 5/2006 | Masui et al. | ................ | 180/68.5 |
| 7,079,379 B2 * | 7/2006 | Yamaguchi et al. | .......... | 361/676 |
| 7,311,170 B2 * | 12/2007 | Isoda et al. | .................. | 180/296 |
| 7,398,849 B2 * | 7/2008 | Yoshida | ...................... | 180/68.5 |
| 7,533,748 B2 * | 5/2009 | Miyajima et al. | ........... | 180/68.5 |
| 2003/0186115 A1 * | 10/2003 | Shibasawa et al. | ........... | 429/100 |
| 2003/0226699 A1 * | 12/2003 | Cheng | ........................ | 180/68.5 |
| 2003/0234123 A1 * | 12/2003 | Schumann et al. | .......... | 180/65.1 |
| 2005/0173170 A1 * | 8/2005 | Miyajima et al. | ........... | 180/68.5 |
| 2006/0289224 A1 * | 12/2006 | Ono et al. | .................... | 180/311 |
| 2007/0017720 A1 * | 1/2007 | Fujii et al. | .................. | 180/68.5 |

(Continued)

FOREIGN PATENT DOCUMENTS

JP    10-129277 A    5/1998

*Primary Examiner*—Christopher P Ellis
*Assistant Examiner*—Jacob Meyer
(74) *Attorney, Agent, or Firm*—Birch, Stewart, Kolasch & Birch, LLP

(57) ABSTRACT

A beam member is fixed to a side member of a vehicle body. The side member is provided with a nut member and a reinforcing member. A bolt is inserted into the nut member from under the side member. The reinforcing member includes first and second plate portions. The first plate portion includes a pair of flanges that are bent individually at bent portions. The respective positions of the bent portions are adjusted depending on a distance between sidewalls of the side member. The flanges are welded to the sidewalls. The second plate portion includes a base portion welded to the lower end of the nut member and an upright portion extending along the nut member.

3 Claims, 10 Drawing Sheets

U.S. PATENT DOCUMENTS

2007/0284167 A1* 12/2007 Watanabe et al. .......... 180/68.5
2008/0173488 A1* 7/2008 Takasaki .................... 180/68.5
2008/0173489 A1* 7/2008 Takasaki .................... 180/68.5
2008/0190679 A1* 8/2008 Sato et al. .................. 180/68.5
2008/0196957 A1* 8/2008 Koike et al. ................ 180/68.5

* cited by examiner

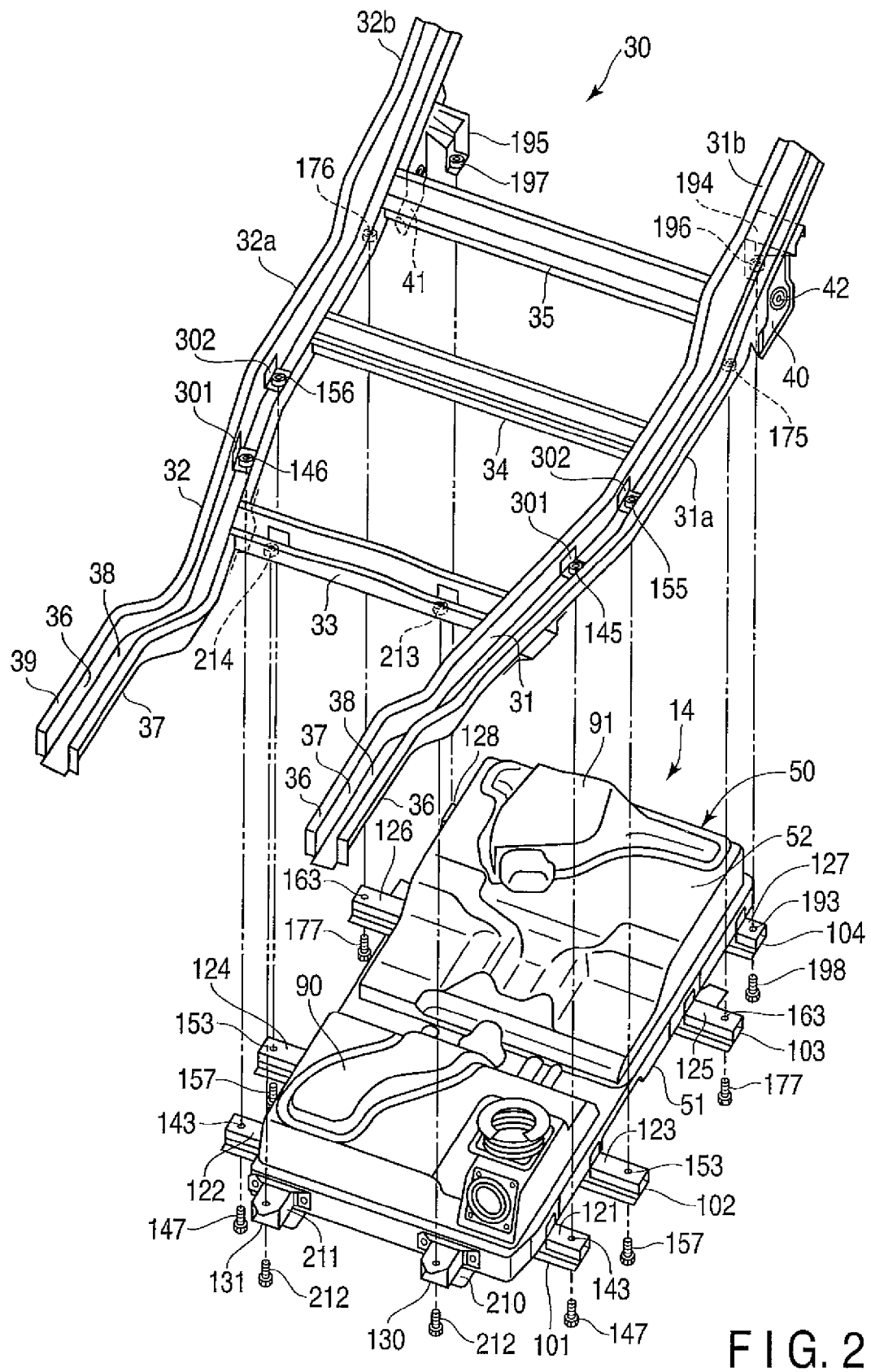
F I G. 2

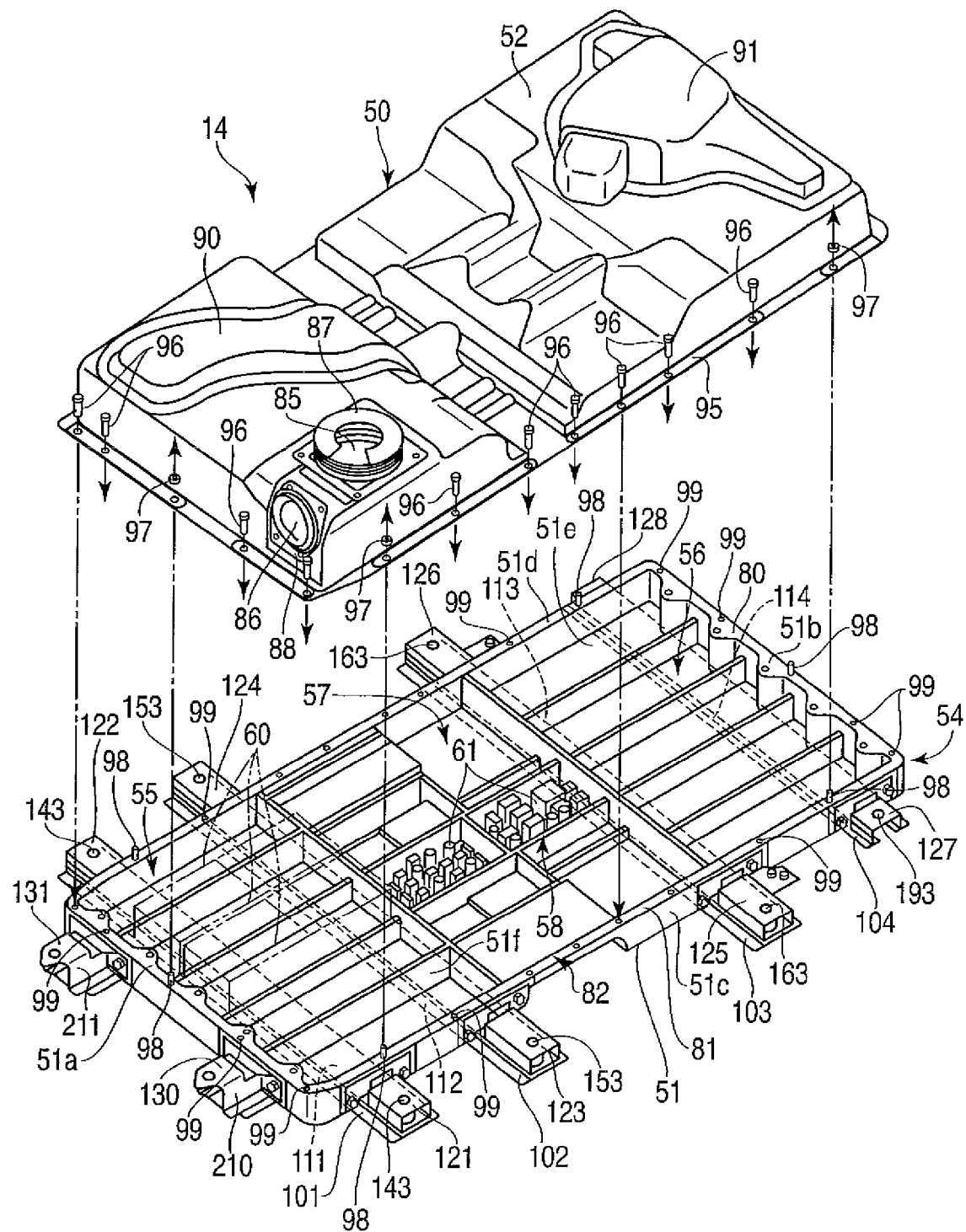
F I G. 3

— 1 —
BATTERY UNIT MOUNTING STRUCTURE FOR ELECTRIC VEHICLE

CROSS-REFERENCE TO RELATED APPLICATIONS

This application is based upon and claims the benefit of priority from prior Japanese Patent Application No. 2007-323729, filed Dec. 14, 2007, the entire contents of which are incorporated herein by reference.

BACKGROUND OF THE INVENTION

1. Field of the Invention

This invention relates to a battery unit mounting structure for fixing a battery unit as a power source for an electric vehicle to a vehicle body.

2. Description of the Related Art

An electric vehicle is expected to be mounted with a large battery unit to maximize its mileage. Therefore, some battery units may weigh more than, for example, 100 kgw. In order to fix one such heavy battery unit securely to side members of a vehicle body, it is essential to increase the strength of battery unit mounting portions of the side members. The side members are also referred to as side frames.

A battery support structure for fixing a battery unit to side members of a vehicle body is disclosed in Jpn. Pat. Appln. KOKAI Publication No. 10-129277. In this battery support structure, reinforcing members are provided in the side member. Nuts are welded to the reinforcing members, individually. The battery unit is fixed to the side members by screwing bolts individually into the nuts from below the vehicle body and tightening the bolts.

The battery unit is expected to be supported in such a manner that its load is dispersed to a plurality of points on each side member. Therefore, the battery unit is fixed to battery unit mounting portions on a plurality of parts of each side member. In consideration of the required rigidity and relationships with their surrounding members, however, each side member is generally designed so that its cross-sectional shape varies along the longitudinal direction of the vehicle body.

The battery unit mounting portions are provided on a plurality of points in the longitudinal direction of each side member. These mounting portions vary in cross-sectional shape depending on their location. In some cases, therefore, the battery unit mounting portions cannot share reinforcing members of a common shape. Thus, it is necessary to manufacture a plurality of types of reinforcing members. In this case, many types of components must be used, so that the manufacturing cost is increased, and in addition, the components require laborious control or management.

BRIEF SUMMARY OF THE INVENTION

The object of the present invention is to provide a battery unit mounting structure designed so that battery unit mounting portions of side members can be increased in strength and components can be standardized.

The present invention is a battery unit mounting structure for fixing a battery unit of an electric vehicle to a vehicle body, which comprises: a beam member which is located in the transverse direction of the vehicle body, between a pair of side members extending in the longitudinal direction of the vehicle body and supports the battery unit; a cylindrical nut member such as a pipe nut located in each of the side members and extending vertically; a bolt which is inserted into the nut member from under the side member and fixes a fastening portion of the beam member to a lower surface of the side member; and a reinforcing member provided at a position corresponding to the nut member within the side member, the reinforcing member including a first plate portion located between a pair of sidewalls of the side member and a second plate portion located on a bottom wall of the side member, the first plate portion including a connecting wall to which an upper part of the nut member is fixed and which extends in the transverse direction of the vehicle body and a pair of flanges which are bent in positions corresponding to a distance between the sidewalls of the side member on the opposite sides of the connecting wall and welded individually to the sidewalls of the side member, the second plate portion including a base portion to which a lower end of the nut member is fixed and which is fixed to the bottom wall of the side member, an upper end portion fixed to the first plate portion, and an upright portion which is provided between the base portion and the upper end portion and which extends vertically.

According to this arrangement, the reinforcing member can increase the strength of a battery unit mounting portion of the side member against a load that acts in a transverse direction of the vehicle body. The reinforcing member is provided at a position corresponding to the nut member within the side member. In mounting the reinforcing member in a region where the distance between the sidewalls is different, based on the cross section of the side member, the position of a bent portion of the reinforcing member can be adjusted to fit the distance between the sidewalls of the side member. Thus, in providing the reinforcing members on a plurality of battery unit mounting portions of the side member with different cross sections, components of the reinforcing members can be standardized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a perspective view of a frame structure and the battery unit of the electric vehicle shown in FIG. 1;

FIG. 3 is a perspective view of a tray member, a cover member, and beam members of the battery unit shown in FIG. 2;

DETAILED DESCRIPTION OF THE INVENTION

One embodiment of the present invention will now be described with reference to FIGS. 1 to 8.

Figure 1:
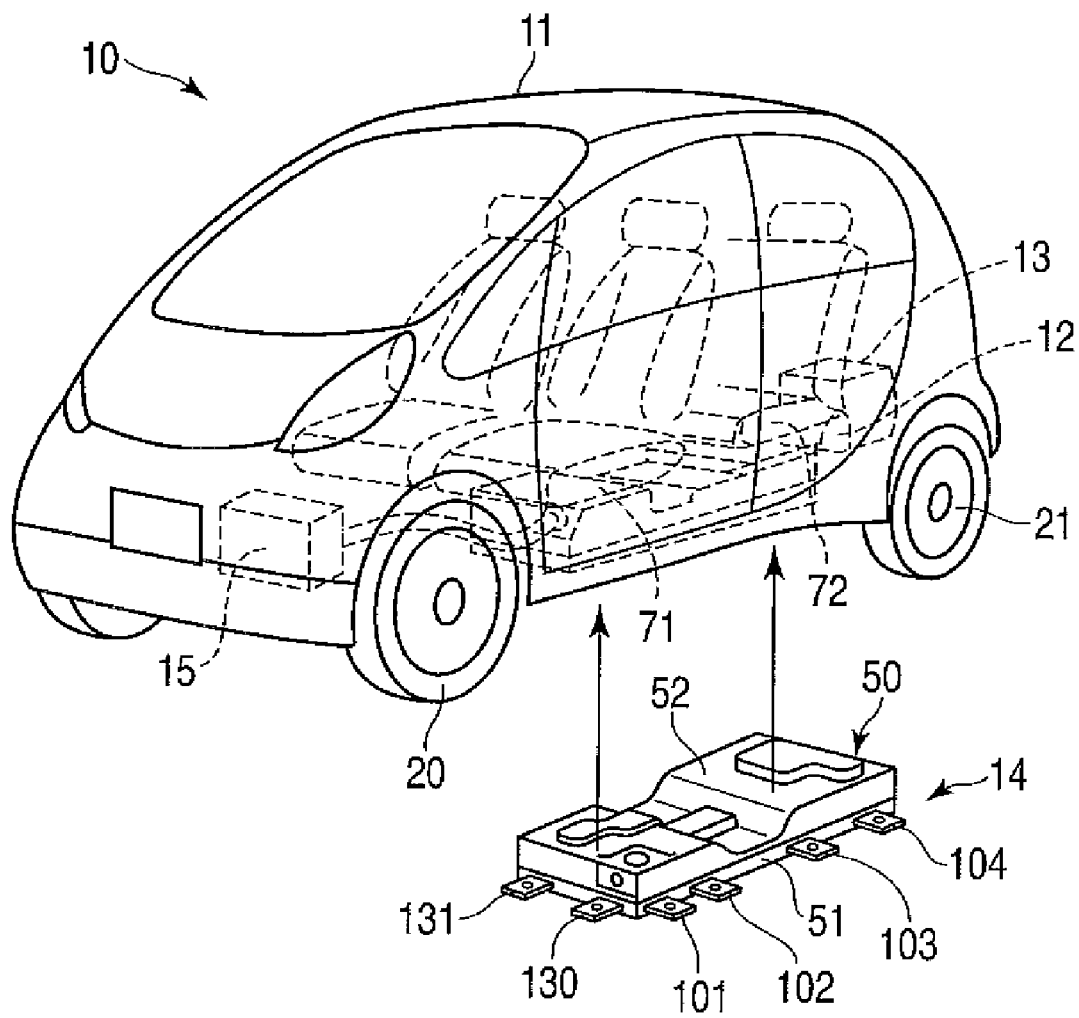
FIG. 1 is a perspective view of an electric vehicle provided with a battery unit according to one embodiment of the invention.

FIG. 1 shows an example of an electric vehicle 10. The electric vehicle 10 is provided with a traction motor 12 and a charger 13, which are located at the rear part of a vehicle body 11, a battery unit 14 under the floor of the vehicle body 11, etc. A heat exchange unit 15 for cooling and heating is disposed in the front part of the vehicle body 11.

FIG. 2 shows a frame structure 30, which forms a framework of the lower part of the vehicle body 11, and the battery unit 14 to be mounted on the frame structure 30. The frame structure 30 includes a pair of side members 31 and 32 (left and right), which extend in the longitudinal direction of the vehicle body 11, and cross members 33, 34 and 35 extending in the width direction of the vehicle body 11. The cross members 33, 34 and 35 are fixed in predetermined positions on the side members 31 and 32 by welding.

The side members 31 and 32 that form parts of the vehicle body 11 are spaced from each other in the transverse direction of the vehicle body 11. Each of the side members 31 and 32 includes a pair of sidewalls 36 and 37 (left and right), a bottom wall 38, and a flange 39. The bottom wall 38 connects the respective lower ends of the sidewalls 36 and 37. The flange 39 is formed on the upper end of each of the sidewalls 36 and 37. The side members 31 and 32 each have a hat-shaped cross section that opens upward. A floor panel 70 (mentioned later) is bonded to the respective upper surfaces of the side members 31 and 32. The side members 31 and 32 and the floor panel 70 form a closed cross section.

Suspension arm support brackets 40 and 41 are provided on the rear parts of the side members 31 and 32, respectively. The support brackets 40 and 41 are fixed at predetermined positions on the side members 31 and 32, respectively, by welding. The support brackets 40 and 41 are provided with pivotal portions 42, individually. The front end portions of trailing arms that constitute parts of a rear suspension are mounted on the pivotal portions 42, individually.

As shown in FIG. 3, the battery unit 14 is provided with a battery case 50. The battery case 50 includes a tray member 51 situated on the lower side and a cover member 52 on the upper side.

Figure 7:
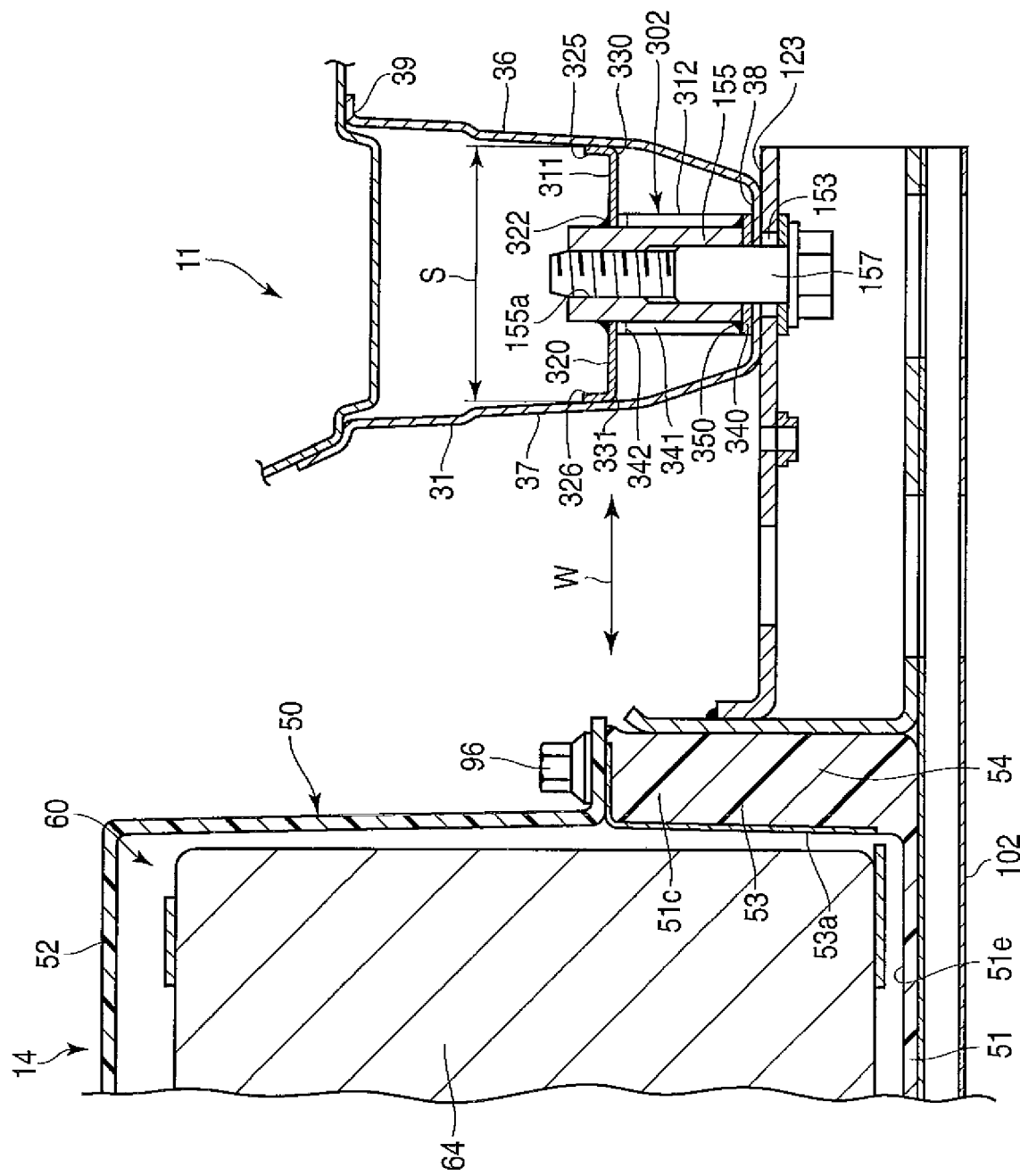
FIG. 7 is a partial sectional view of the battery unit and a vehicle body taken along line F7-F7 of FIG. 5.

As partially shown in FIG. 7, the tray member 51 is composed of a resin portion 53, an insert member 53a for reinforcement, etc. The resin portion 53 is integrally molded of an electrically insulating resin. The insert member 53a is formed of a metal plate. A base material of the resin portion 53 is a resin such as polypropylene, which is reinforced by short glass fibers that are several millimeters to several centimeters long.

The tray member 51 is in the form of an open-topped box, which includes a front wall 51a, a rear wall 51b, a pair of sidewalls 51c and 51d (left and right), a bottom wall 51e, and a partition wall 51f. The sidewalls 51c and 51d of the tray member 51 are arranged along the side members 31 and 32, respectively. The front wall 51a, rear wall 51b, and sidewalls 51c and 51d constitute a peripheral wall 54 of the tray member 51. The peripheral wall 54, bottom wall 51e, and partition wall 51f are molded integrally with one another.

A front battery storage section 55 is formed at the front-half portion of the battery case 50. A rear battery storage section 56 is formed at the rear-half portion of the battery case 50. A central battery storage section 57, an electric circuit storage section 58, etc., are formed between the front and rear battery storage sections 55 and 56.

A battery module 60 (partially indicated by two-dot chain lines in FIG. 3) is contained in each of the battery storage sections 55, 56 and 57. The battery modules 60 are arranged on the bottom wall 51e of the tray member 51. The electric circuit storage section 58 contains monitors for detecting the states of the battery modules 60, electrical components 61 for control, etc. The electrical components 61 are electrically connected to the battery modules 60. Each battery module 60 is constructed by connecting a plurality of battery cells in series with one another.

Figure 4:
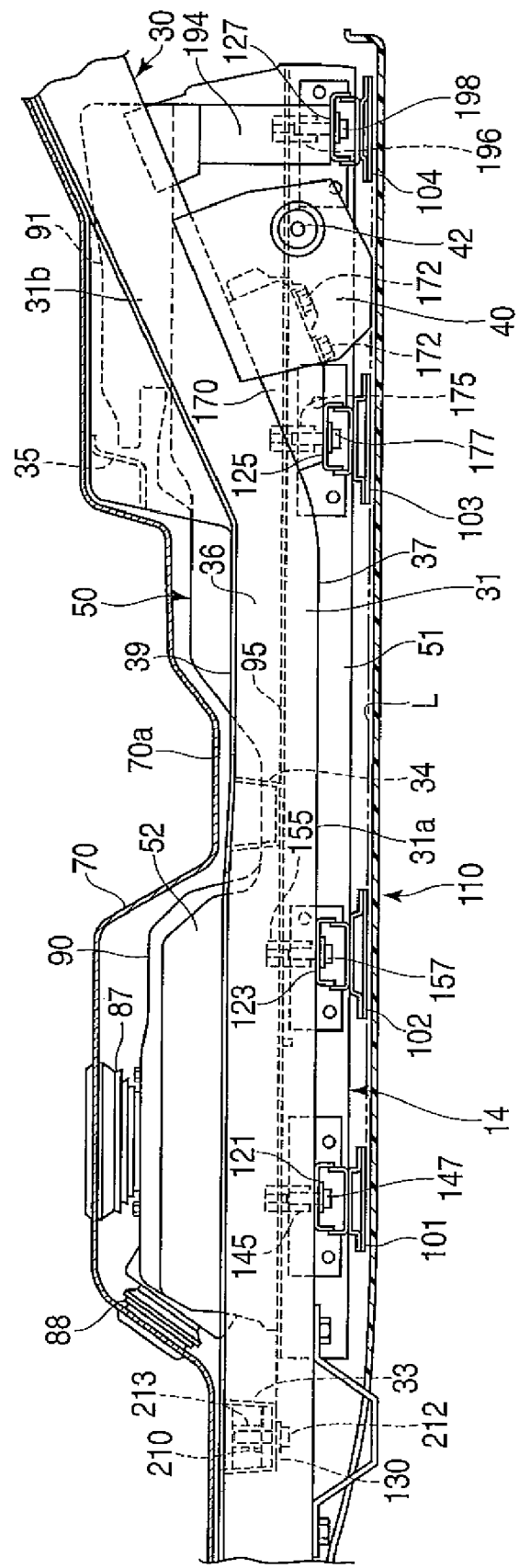
FIG. 4 is a side view of the frame structure and the battery unit of the electric vehicle shown in FIG. 1.

As shown in FIG. 4, the battery unit 14 is located under the floor panel 70. The floor panel 70 extends longitudinally and in a transverse direction of the vehicle body 11 and constitutes a floor portion of the vehicle body 11. The floor panel 70 is fixed by welding at a predetermined position on the frame structure 30 that includes the side members 31 and 32.

A front seat 71 (shown in FIG. 1) and a rear seat 72 are arranged above the floor panel 70. The front battery storage section 55 of the battery unit 14 is located under the front seat 71. The rear battery storage section 56 of the battery unit 14 is located under the rear seat 72. A recessed portion 70a of the floor panel 70 is formed between the front and rear battery storage sections 55 and 56. The recessed portion 70a is situated near a space for the feet of an occupant in the rear seat 72.

A cover mounting surface 80 (shown in FIG. 3) is formed on the peripheral edge portion of the tray member 51 of the battery case 50. The cover mounting surface 80 is continuous throughout the circumference of the tray member 51. A waterproof seal 81 is provided on the peripheral edge portion of a junction 82 between the tray member 51 and the cover member 52.

The cover member 52 of the battery case 50 is an integral molded product of a fiber-reinforced synthetic resin. An opening part 85 for a service plug and a cooling air inlet 86 are formed in the front part of the cover member 52. A bellows-like boot member 87 is attached to the opening part 85. A bellows-like boot member 88 is also attached to the cooling air inlet 86. The cover member 52 is provided in its upper surface with a bypass passage portion 90 through which some cooling air is run, a cooling fan holder 91, etc.

A flange portion 95 is formed on the peripheral edge portion of the cover member 52. The flange portion 95 is continuous throughout the circumference of the cover member 52. The cover member 52 is put on the tray member 51. The cover mounting surface 80 of the tray member 51 and the flange portion 95 of the cover member 52 are joined together. A nut member 97 is screwed onto an anchor bolt 98 from above the cover member 52. The nut member 97 is tightened to the anchor bolt 98. Further, a bolt member 96 is screwed into an anchor nut 99 from above the cover member 52 and tightened to the nut 99. Thus, the tray member 51 and the cover member 52 are watertightly fixed to each other with the waterproof seal 81 between them.

A plurality of (e.g., four) beam members 101, 102, 103 and 104 are provided on the underside of the tray member 51. An under cover 110 (shown in FIGS. 4 and 5) is located below the battery unit 14. The under cover 110 is at least partially fixed to the frame structure 30 and the beam members 101, 102, 103 and 104 from under the body 11 by bolts (not shown).

Figure 5:
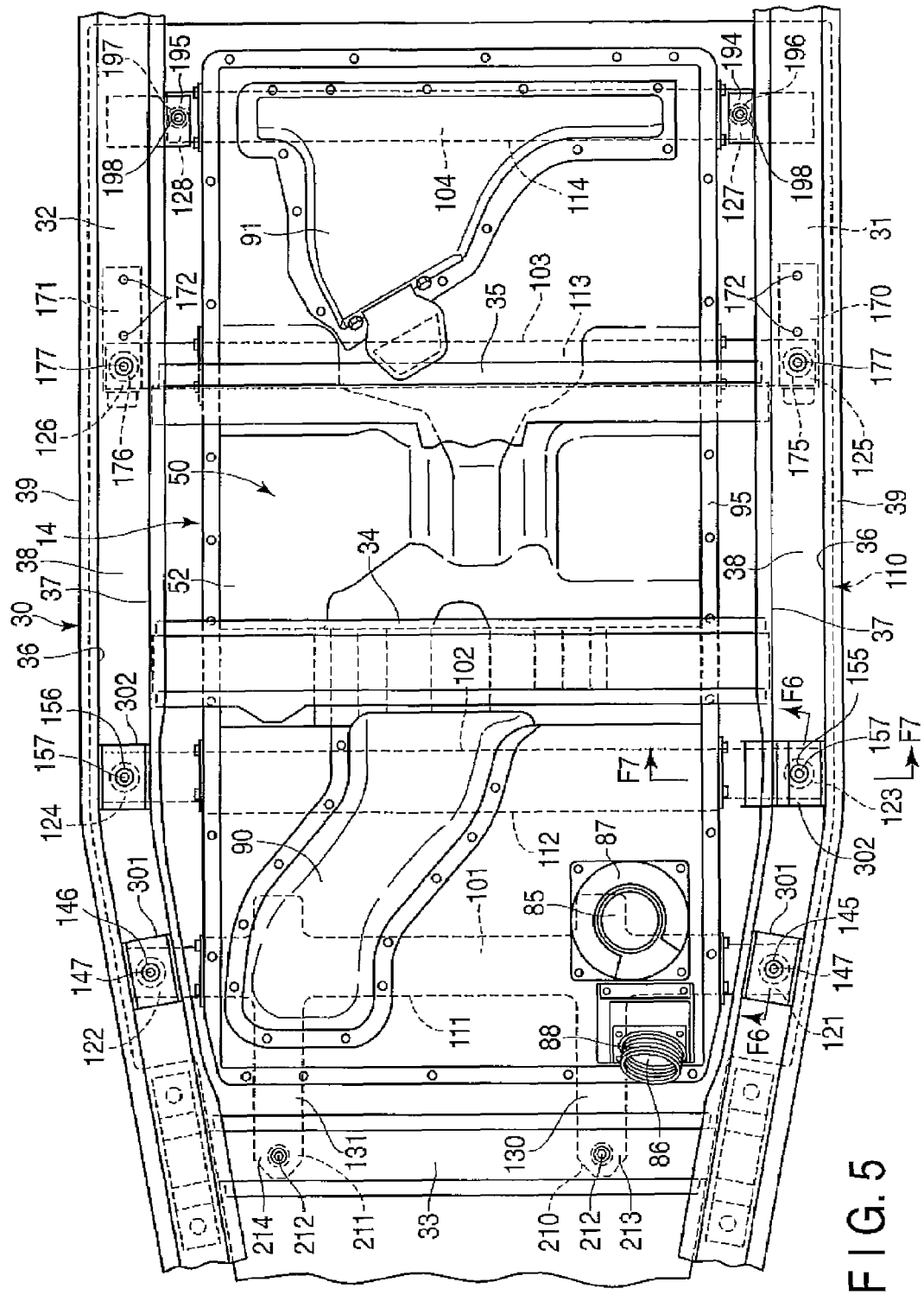
FIG. 5 is a plan view of the frame structure and the battery unit of the electric vehicle shown in FIG. 1.

As shown in FIGS. 3 and 5, the beam members 101, 102, 103 and 104 include beam bodies 111, 112, 113 and 114, respectively, which extend in a transverse direction of the vehicle body 11. The beam bodies 111, 112, 113 and 114 are formed of a metallic material (e.g., steel plate) that has a sufficient strength to support the load of the battery unit 14.

Fastening portions 121 and 122 are provided individually at the opposite ends of the foremost beam body 111. Fastening portions 123 and 124 are provided individually at the opposite ends of the second foremost beam body 112. Fastening portions 125 and 126 are provided individually at the opposite ends of the third foremost beam body 113. Fastening portions 127 and 128 are provided individually at the opposite ends of the fourth foremost (or rearmost) beam body 114. A pair of front support members 130 and 131, left and right, are provided on the front end portion of the battery unit 14.

A bolt insertion hole 143 (shown in FIGS. 2 and 3) vertically penetrates each of the fastening portions 121 and 122 at the opposite ends of the foremost beam member 101. Battery unit mounting portions that are provided individually with nut members 145 and 146 are located at positions on the side members 31 and 32 opposite the fastening portions 121 and 122, respectively. The nut members 145 and 146 are so-called pipe nuts in the form of vertically extending cylinders. Those parts of the side members 31 and 32 which are provided with the nut members 145 and 146 are the battery unit mounting portions.

Bolts 147 (shown in FIGS. 2 and 4) are inserted individually into the bolt insertion holes 143 from under the fastening portions 121 and 122. These bolts 147 are screwed individually into the nut members 145 and 146 and tightened. By doing this, the fastening portions 121 and 122 of the foremost beam member 101 are fixed to the lower surfaces of the side members 31 and 32, respectively.

A bolt insertion hole 153 (shown in FIGS. 2 and 3) vertically penetrates each of the fastening portions 123 and 124 at the opposite ends of the second foremost beam member 102. Battery unit mounting portions that are provided individually with nut members 155 and 156 are located at positions on the side members 31 and 32 opposite the fastening portions 123 and 124, respectively. The nut members 155 and 156 are so-called pipe nuts in the form of vertically extending cylinders. Those parts of the side members 31 and 32 which are provided with the nut members 155 and 156 are the battery unit mounting portions.

Bolts 157 (shown in FIGS. 2 and 4) are inserted individually into the bolt insertion holes 153 from under the fastening portions 123 and 124. These bolts 157 are screwed individually into the nut members 155 and 156 and tightened. By doing this, the fastening portions 123 and 124 of the second foremost beam member 102 are fixed to the lower surfaces of the side members 31 and 32, respectively.

A bolt insertion hole 163 (shown in FIGS. 2 and 3) vertically penetrates each of the fastening portions 125 and 126 at the opposite ends of the third foremost beam member 103. As shown in FIGS. 4 and 5, load transmission members 170 and 171 are fixed individually to the side members 31 and 32 by bolts 172. These load transmission members 170 and 171 are located over the fastening portions 125 and 126, respectively, of the third foremost beam member 103. The one load transmission member 170 is welded to the one suspension arm support bracket 40. The other load transmission member 171 is welded to the other suspension arm support bracket 41.

Specifically, the load transmission members 170 and 171 are coupled to the side members 31 and 32 and the suspension arm support brackets 40 and 41, respectively. These load transmission members 170 and 171 constitute a part of the frame structure 30. The load transmission members 170 and 171 are provided with battery unit mounting portions that include nut members 175 and 176, respectively. The nut members 175 and 176 are so-called pipe nuts in the form of vertically extending cylinders.

Bolts 177 are inserted individually into the bolt insertion holes 163 from under the fastening portions 125 and 126. These bolts 177 are screwed individually into the nut members 175 and 176 and tightened. By doing this, the fastening portions 125 and 126 of the third foremost beam member 103 are fixed to the lower surfaces of the side members 31 and 32 with the aid of the load transmission members 170 and 171, respectively.

A bolt insertion hole 193 (shown in FIGS. 2 and 3) vertically penetrates each of the fastening portions 127 and 128 of the fourth foremost beam member 104. The side members 31 and 32 are provided with extension brackets 194 and 195 at positions on the side members 31 and 32 opposite the fastening portions 127 and 128, respectively. The extension brackets 194 and 195 extend below kick-up portions 31b and 32b of the side members 31 and 32, respectively. The extension brackets 194 and 195 constitute a part of the frame structure 30. The extension brackets 194 and 195 are provided with battery unit mounting portions that include nut members 196 and 197, respectively.

Bolts 198 (shown in FIGS. 2 and 4) are inserted individually into the bolt insertion holes 193 from under the fastening portions 127 and 128. These bolts 198 are screwed individually into the nut members 196 and 197 and tightened. By doing this, the fastening portions 127 and 128 of the fourth foremost beam member 104 are fixed to the lower surfaces of the side members 31 and 32 with the aid of the extension brackets 194 and 195, respectively.

As shown in FIG. 4, the respective lower surfaces of the beam members 101, 102, 103 and 104 are situated along a flat lower surface of the tray member 51 and on one plane L that extends horizontally. The foremost and second foremost beam members 101 and 102 are fixed to horizontal portions 31a and 32a of the side members 31 and 32, respectively. Under the kick-up portions 31b and 32b, the third foremost beam member 103 is fixed to the side members 31 and 32 with the aid of the load transmission members 170 and 171, respectively. The fourth foremost beam member 104 is fixed to the side members 31 and 32 with the aid of the extension brackets 194 and 195, respectively.

The front support members 130 and 131 that are situated at the front end of the battery unit 14 project forward from the foremost beam member 101. The front support members 130 and 131 are coupled to the beam member 101. As shown in FIG. 2, the cross member 33 is provided with a battery unit mounting portion that includes nut members 213 and 214. Fastening portions 210 and 211 of the front support members 130 and 131 are fixed to the lower surface of the cross member 33 by screwing bolts 212 individually into the nut members 213 and 214 from under the vehicle body 11 and tightening them.

Thus, in the electric vehicle 10 of the present embodiment, the beam members 101, 102, 103 and 104 extend between the left and right side members 31 and 32. The side members 31 and 32 are coupled to each other by these beam members 101, 102, 103 and 104. Accordingly, the beam members 101, 102, 103 and 104 of the battery unit 14 can function as rigid members that are equivalent to cross members.

Transverse loads that are applied to the suspension arm support brackets 40 and 41 are applied to the beam member 103 through the load transmission members 170 and 171. Regions near the support brackets 40 and 41 are increased in rigidity by the beam member 103. Thus, the driving stability and ride comfort of the vehicle can be improved even though no cross members are arranged near the support brackets 40 and 41. In addition, a part of the large battery unit 14 can be located in a space between the suspension arm support brackets 40 and 41. In consequence, the large battery unit 14 can be mounted with ease, and the mileage of the electric vehicle can be extended.

Figure 6:
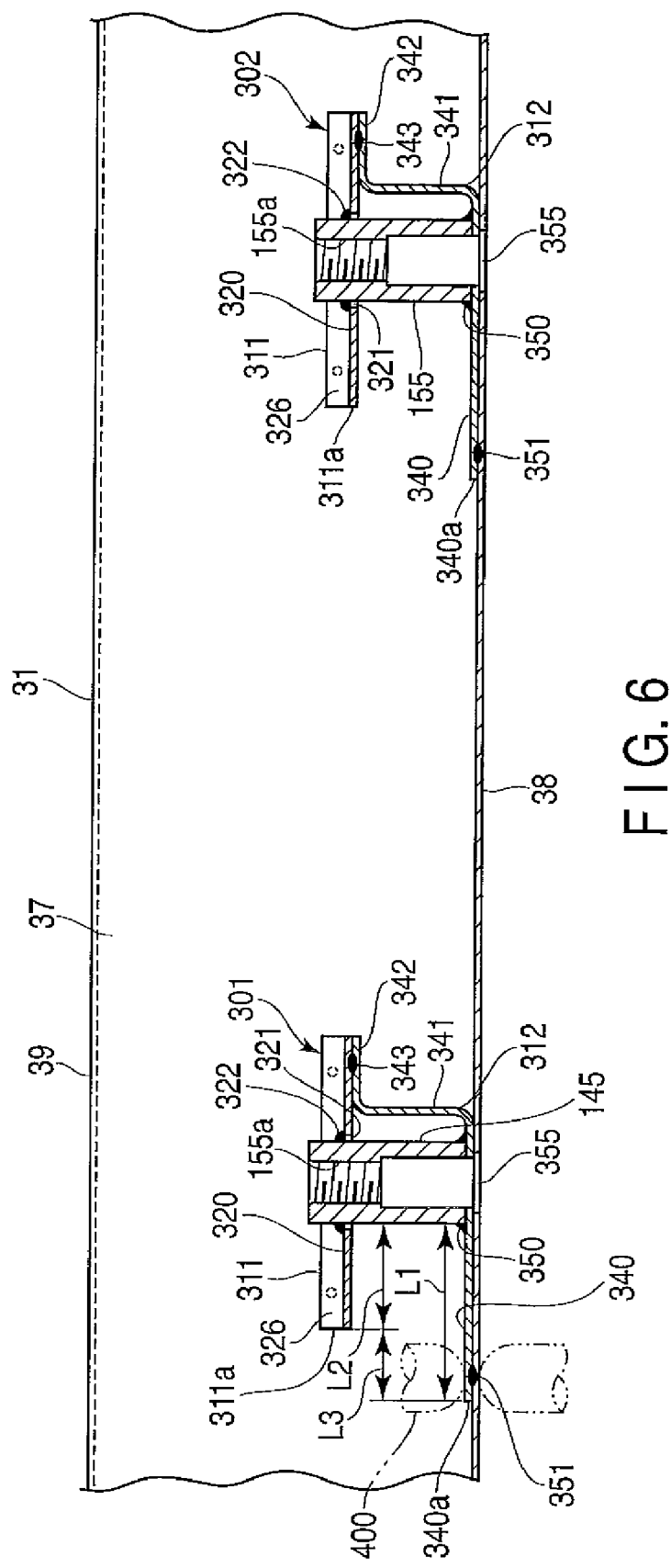
FIG. 6 is a side view of a side member taken along line F6-F6 of FIG. 5.

As shown in FIGS. 5 and 6, the side members 31 and 32 are provided with the nut members 145 and 146, which are used to fix the fastening portions 121 and 122 of the foremost beam member 101, and reinforcing members 301 described below. The nut members 155 and 156, which are used to fix the fastening portions 123 and 124 of the second foremost beam member 102, and reinforcing members 302 described below are provided behind the reinforcing members 301. The nut members 145, 146, 155 and 156 are fixed to the side members 31 and 32 by the reinforcing members 301 and 302.

The reinforcing members 301 and 302 provided on the one side member 31 are constructed in the same manner as those on the other side member 32. Therefore, the one reinforcing member 302 shown in FIGS. 7 and 8 will now be described representatively.

The reinforcing member 302 is composed of a first plate portion 311, located between the sidewalls 36 and 37 of the side member 31, and a second plate portion 312, located on the bottom wall 38 of the side member 31. The first plate portion 311, which doubles as a bulkhead, is situated above the second plate portion 312. These first and second plate portions 311 and 312 are each formed of a metal plate and formed into the following shape by pressing. Alternatively, the plate portions 311 and 312 may be formed by bending one metal plate.

The first plate portion 311 includes a connecting wall 320 that extends between the sidewalls 36 and 37 of the side member 31. The connecting wall 320 extends in a transverse direction of the vehicle body 11. A length S (shown in FIG. 7) of the connecting wall 320 is equivalent to the distance between the sidewalls 36 and 37 of the side member 31. The cylindrical nut member (pipe nut) 155 is inserted into a hole 321 in the connecting wall 320. The nut member 155 has a vertically extending axis X (shown in FIG. 8) and is located on the bottom wall 38 of the side member 31. The upper part of the nut member 155 is fixed to the connecting wall 320 by welds 322 formed by arc welding or the like.

A pair of flanges 325 and 326 are formed by upwardly bending the opposite side parts of the first plate portion 311 at bent portions 330 and 331. These flanges 325 and 326 are situated corresponding to the bent portions 330 and 331, respectively, on the opposite sides of the connecting wall 320. The respective positions of the bent portions 330 and 331 or the distance between the flanges 325 and 326 is adjusted depending on the distance S (shown in FIG. 7) between the sidewalls 36 and 37 of the side member 31.

If the distance S between the sidewalls 36 and 37 varies due to the cross section of the side member 31, such variation can be mitigated by adjusting the positions of the bent portions 330 and 331. The flanges 325 and 326 are fixed to the sidewalls 36 and 37, respectively, of the side member 31 by welds 332 formed by spot welding or the like.

The second plate portion 312 includes a base portion 340, an upright portion 341, and an upper end portion 342. The lower end of the nut member 155 is fixed to the base portion 340. The upright portion 341 rises from one end of the base portion 340. The upper end portion 342 is provided on the upper end of the upright portion 341. The upper end portion 342 is fixed to the lower surface of the connecting wall 320 of the first plate portion 311 by a weld 343 formed by spot welding or the like.

The lower end of the nut member 155 is fixed to the base portion 340 by welds 350 formed by arc welding or the like. The base portion 340 is fixed to the bottom wall 38 of the side member 31 by a weld 351 formed by spot welding or the like. A through-hole 355 (shown in FIG. 6) is formed in the base portion 340. The through-hole 355 is formed at a position corresponding to a tapped hole 155a of the nut member 155. The upright portion 341 is provided between the base portion 340 and the upper end portion 342. The upright portion 341 extends substantially parallel to the axis X of the nut member 155 (or vertically).

Before the reinforcing member 302 is welded to the side member 31, the first and second plate portions 311 and 312 are welded to each other at the weld 343. The nut member 155 is welded to the plate portions 311 and 312 at the welds 322 and 350.

The reinforcing member 302 sub-assembled in this manner is inserted between the sidewalls 36 and 37 of the side member 31. When the base portion 340 of the reinforcing member 302 gets on the bottom wall 38 of the side member 31, the flanges 325 and 326 temporarily stop at positions corresponding to the height of the upright portion 341. In this state, a spot welding gun is inserted between the sidewalls 36 and 37 of the side member 31. The flanges 325 and 326 of the first plate portion 311 and the sidewalls 36 and 37 of the side member 31 are spot-welded to one another at the welds 332. A spot welding gun 400 (shown in FIG. 6) is inserted between the sidewalls 36 and 37. The base portion 340 of the second plate portion 312 and the bottom wall 38 of the side member 31 are spot-welded to each other at the weld 351 by the spot welding gun 400.

In this manner, the reinforcing member 302 is fixed at a predetermined position on the side member 31, and the nut member 155 is fixed at a predetermined position on the side member 31 by the reinforcing member 302. The nut member 156 for fixing the other fastening portion 124 is also fixed at a predetermined position on the side member 32 by the reinforcing member 302. The fastening portions 121 and 122 of the foremost beam member 101 are fixed by the nut members 145 and 146, respectively. The nut members 145 and 146 are fixed at predetermined positions on the side members 31 and 32, respectively, by the reinforcing members 301 that are formed in the same manner as the reinforcing member 302.

Symbol L1 in FIG. 6 designates the distance from the nut member 145 to an end 340a of the base portion 340 of the second plate portion 312. The end 340a of the base portion 340 is situated opposite the upright portion 341. Symbol L2 designates the distance from the nut member 145 to an end 311a of the first plate portion 311. L1 is longer than L2. If the reinforcing member 301 is viewed from above, therefore, the end 340a of the base portion 340 of the second plate portion 312 can be seen to project from the end 311a of the first plate portion 311 for a predetermined length L3 in the longitudinal direction of the vehicle body.

In other words, the end 340a of the base portion 340 of the second plate portion 312 projects from the end 311a of the first plate portion 311 for the offset amount L3. Accordingly, the spot welding gun (electrode member) 400 can easily nip the bottom wall 38 of the side member 31 and the base portion 340 of the second plate portion 312. Thus, the weld 351 can be spot-welded without using a special electrode member. Further, the other reinforcing member 302 can be welded to the side member 31 in the same manner as the reinforcing member 301 by spot welding.

Let it be supposed that a heavy load is applied in a width direction W of the vehicle body 11 such that the vehicle body 11 undergoes a deformation, such as a twist, while the vehicle is running, at a battery unit mounting portion shown in FIG. 7, for example. In this case, the battery unit 14, which is very heavy, is fixed to the side member 31 by the bolt 157 with the aid of the fastening portion 123 of the beam member 102. Thus, heavy transverse loads act on the nut member 155 and the bolt 157.

However, the nut member 155 of the present embodiment is fixed to the side member 31 by the reinforcing members 302. The connecting wall 320 of each reinforcing member 302 functions as a bulkhead for increasing the rigidity of the battery unit mounting portion of the side member 31. Further, the upper part of the nut member 155 is supported on the sidewalls 36 and 37 of the side member 31 by the connecting wall 320. Therefore, the nut member 155 can be prevented from falling down when it is subjected to a transverse load.

Thus, the battery unit mounting portion of the side member 31 that is provided with the nut member 155 can demonstrate a substantial strength against loads that are applied transversely. Specifically, the reinforcing member 302 can prevent the nut member 155 and the bolt 157 from being disengaged from the battery unit mounting portion of the side member 31. Accordingly, the beam member 102 and the side member 31 can be maintained in a fastened state. The nut members 145, 146 and 156 for fixing the other fastening portions 121, 122 and 124 can also demonstrate a substantial strength against transverse loads with the aid of the reinforcing members 301 and 302.

Since the respective cross sections of the side members 31 and 32 vary in the longitudinal direction, the distance S (shown in FIG. 7) between the sidewalls 36 and 37 of the side members 31 and 32 may vary, depending on the regions where the reinforcing members 301 or 302 are provided.

If the distance between the bent portions 330 and 331 is adjusted based on the distance S between the sidewalls 36 and 37, however, the reinforcing members 301 and 302 of the present embodiment can use the first plate portions 311 of a common metallic material. Therefore, components of the reinforcing members 301 and 302 can be standardized. Further, the height of the flanges 325 and 326 above the base portion 340 can be adjusted by changing the bending position of the upper end portion 342 of the second plate portion 312 to regulate the height of the upright portion 341.

The reinforcing members 301 and 302 may be applied to battery unit mounting portions for fixing the fastening portions 125, 126, 127 and 128 of the other beam members 103 and 104 or battery unit mounting portions for fixing the fastening portions 210 and 211 of the front support members 130 and 131.

According to the embodiment described above, the base portion 340 of the second plate portion 312 extends in the longitudinal direction of the vehicle body 11, and the end 340a of the base portion 340 projects in the longitudinal direction of the vehicle body 11 from the end 311a of the first plate portion 311 as viewed from above. According to this arrangement, the spot welding gun 400 can avoid interfering with the reinforcing member 301 in welding the base portion 340 of the second plate portion 312 to the bottom wall 38 of the side member 31. Accordingly, the base portion 340 of the second plate portion 312 and the bottom wall 38 of the side member 31 can be welded together without using any special electrode member for welding. Thus, good productivity can be secured without entailing high equipment cost for welding.

Figure 8:
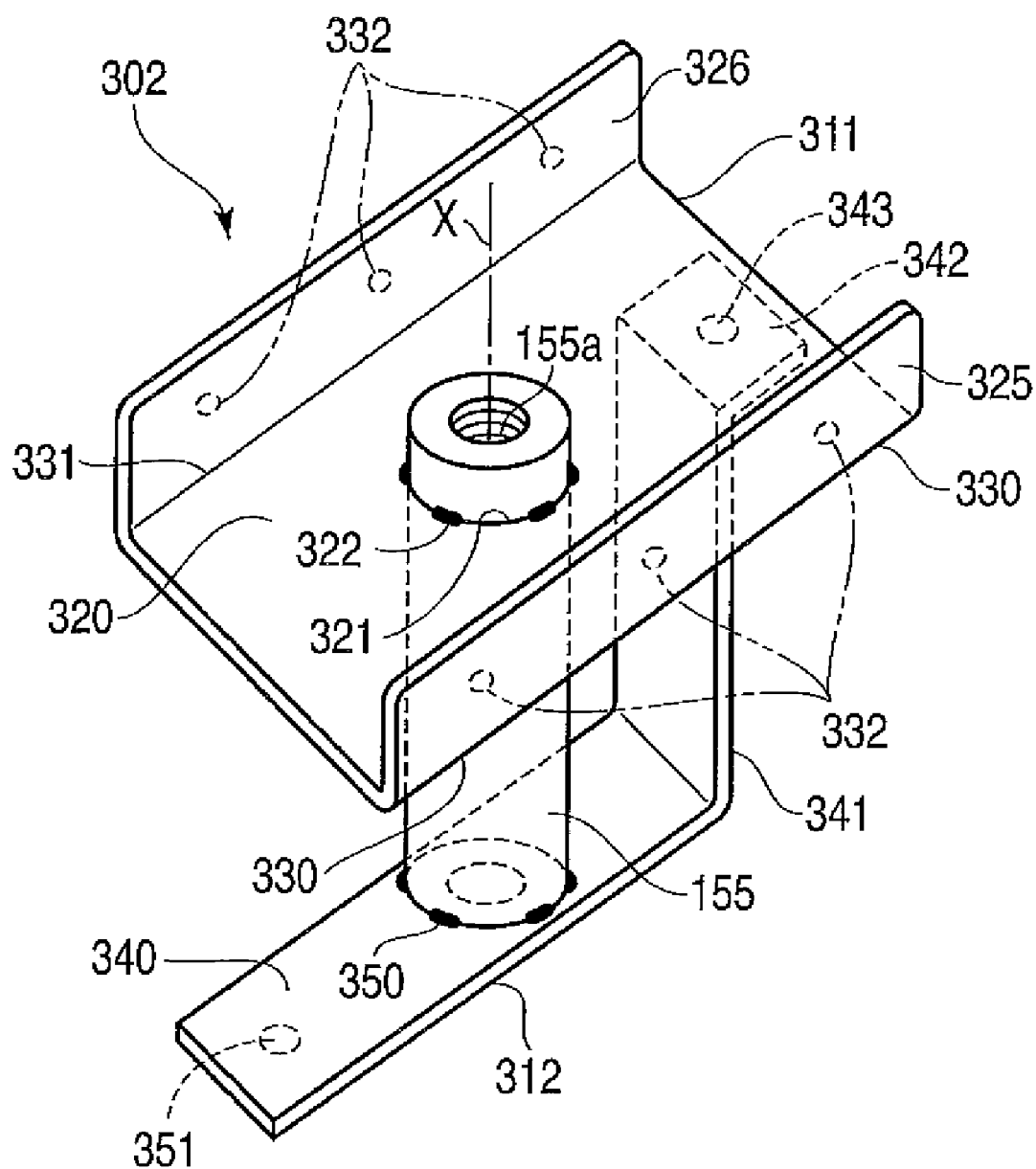
FIG. 8 is a perspective view of a reinforcing member shown in FIG. 7.
Figure 9:
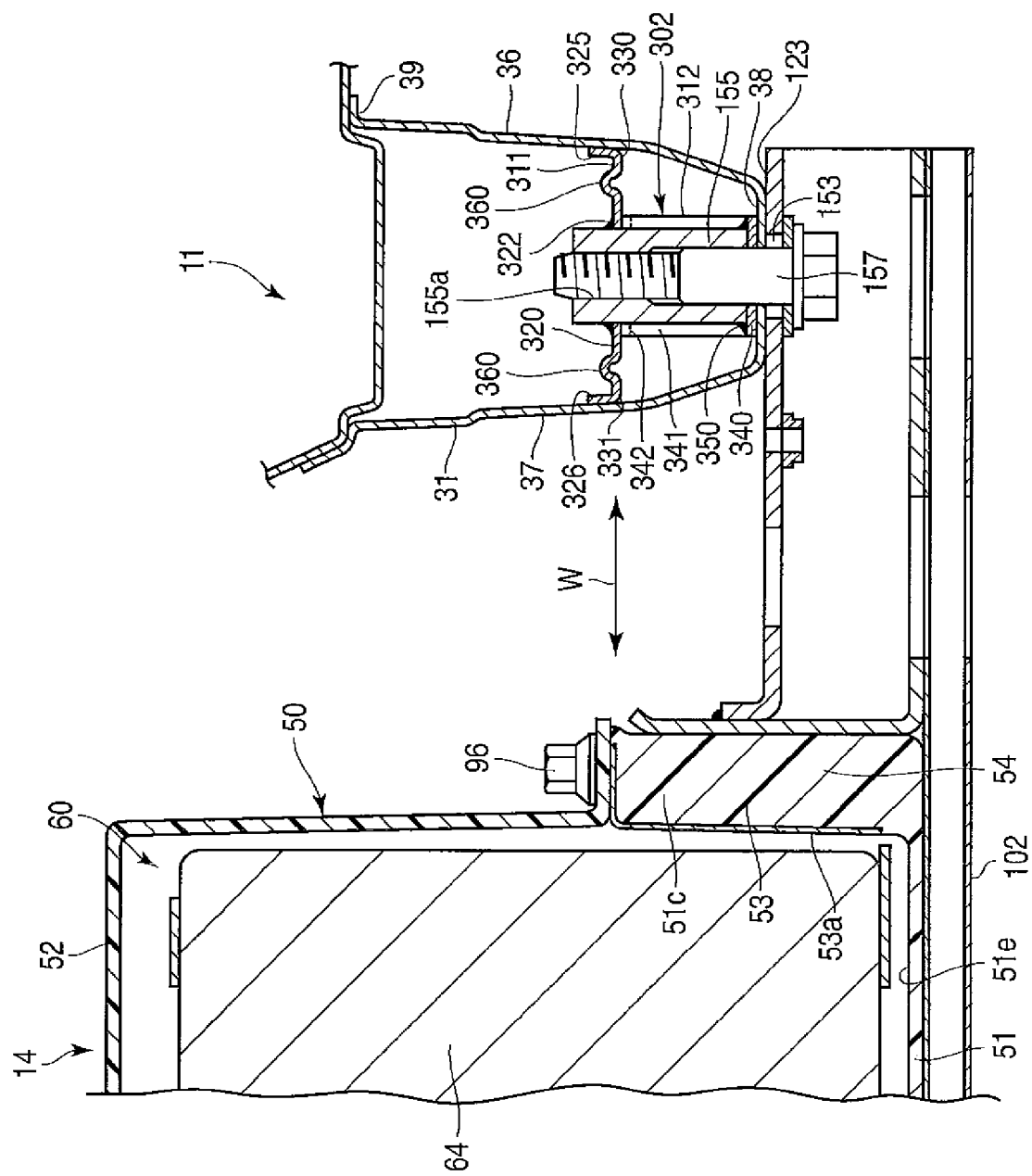
FIG. 9 is a partial sectional view of the battery unit and the vehicle body showing another example of the reinforcing member.
Figure 10:
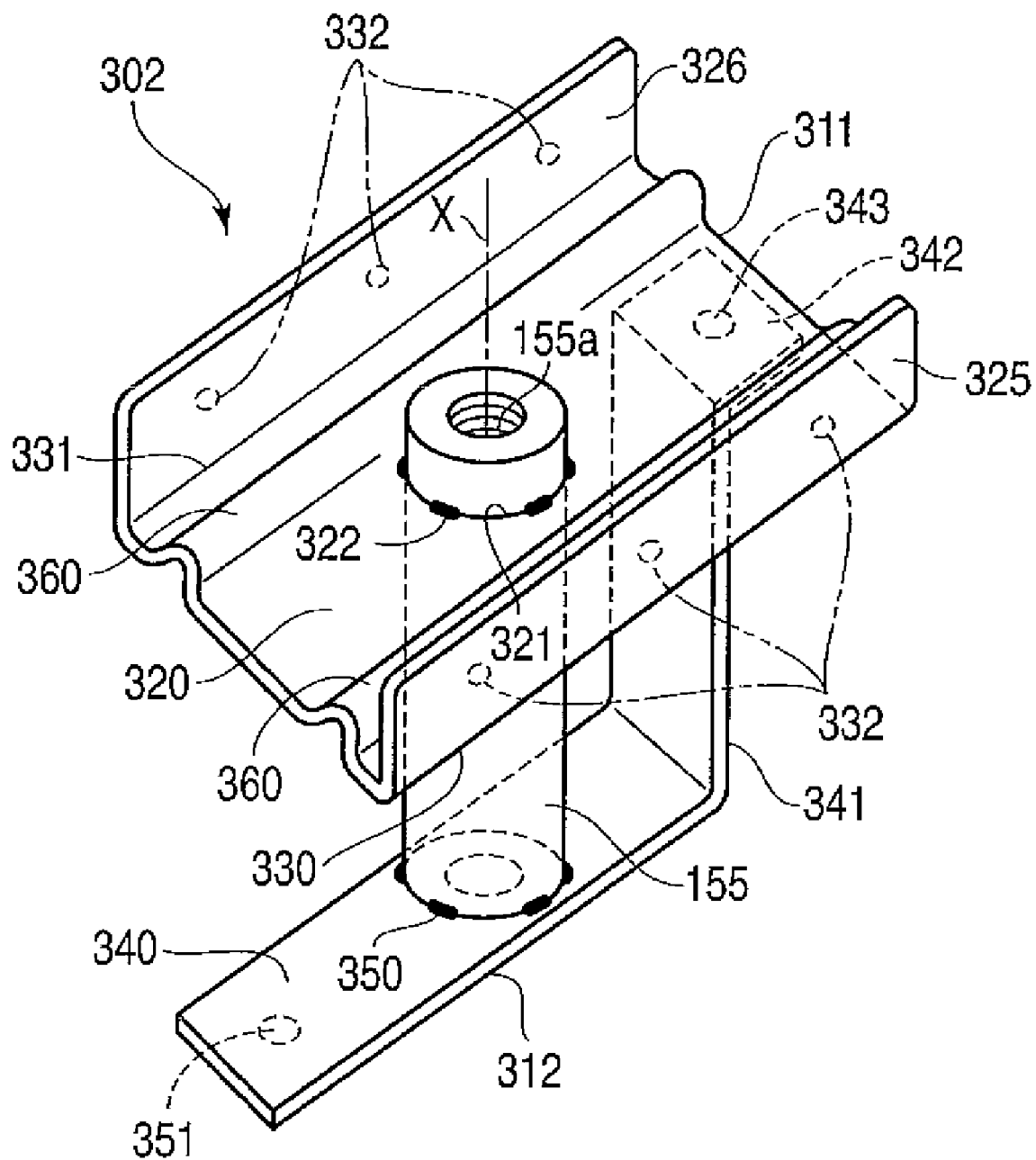
FIG. 10 is a perspective view of the reinforcing member shown in FIG. 9.

FIGS. 9 and 10 show another example of the reinforcing member 302. In the reinforcing member 302 shown in FIG. 10, plastic-worked portions 360 for adjusting the rigidity of the connecting wall 320 of the first plate portion 311 are formed on the connecting wall 320. The plastic-worked portions 360 are deformed beads with a nonlinear (e.g., U-shaped, V-shaped, or corrugated) cross section in the width direction of the vehicle body. Other configurations of this example are the same as those of the reinforcing members 301 and 302 according to the foregoing embodiment (FIGS. 6 to 8).

When a load is applied in the width direction W of the vehicle body 11, as shown in FIG. 9, the plastic-worked portions 360 of the reinforcing member 302 are deformed to absorb some energy. It is possible, therefore, to reduce the possibility of stress concentration such that the welds 332 (shown in FIG. 10) on the first plate portion 311 are separated from the sidewalls 36 and 37 of the side member 31. Thus, the reinforcing member 302 can be restrained from being separated from the sidewalls 36 and 37. The other reinforcing member 301 (shown in FIG. 6) can also be restrained from being separated from the sidewalls 36 and 37 by transverse loads if it is formed with the plastic-worked portions 360.

Although the electric vehicle that is mounted with the traction motor in the rear part of the vehicle body has been described in connection with the foregoing embodiment, the present invention is also applicable to an electric vehicle in which the traction motor is located in the front part of the vehicle body. It is to be understood, in carrying out the present invention, that the construction and arrangement of the components of the invention, including the battery unit, side members, beam members, reinforcing members, bolts, and nut members, may be embodied in suitably modified forms.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A battery unit mounting structure for fixing a battery unit of an electric vehicle to a vehicle body, characterized by comprising:
   a beam member which is located in a transverse direction of the vehicle body between a pair of side members extending in the longitudinal direction of the vehicle body and supports the battery unit;
   a cylindrical nut member located in each of the side members and extending vertically;
   a bolt which is inserted into the nut member from under the side member and fixes a fastening portion of the beam member to a lower surface of the side member; and
   a reinforcing member provided at a position corresponding to the nut member within the side member,
   the reinforcing member including a first plate portion located between a pair of sidewalls of the side member and a second plate portion located on a bottom wall of the side member,
   the first plate portion including a connecting wall to which an upper part of the nut member is fixed and which extends in a transverse direction of the vehicle body and a pair of flanges which are bent in positions corresponding to a distance between the sidewalls of the side member on the opposite sides of the connecting wall and welded individually to the sidewalls of the side member,
   the second plate portion including a base portion to which a lower end of the nut member is fixed and which is fixed to the bottom wall of the side member, an upper end portion fixed to the first plate portion, and an upright portion which is provided between the base portion and the upper end portion and extends vertically.

2. A battery unit mounting structure according to claim 1, characterized in that the base portion of the second plate portion extends in the longitudinal direction of the vehicle body, and an end of the base portion projects in the longitudinal direction of the vehicle body from an end of the first plate portion as viewed from above.

3. A battery unit mounting structure according to claim 1, characterized in that the connecting wall of the reinforcing member is formed with a plastic-worked portion which is formed so that a cross section thereof along the width of the vehicle body is nonlinear and extends in the longitudinal direction of the vehicle body.

* * * * *